May 19, 1936.  J. H GOSS  2,041,601
JEWEL BEARING
Filed July 25, 1934   2 Sheets-Sheet 2

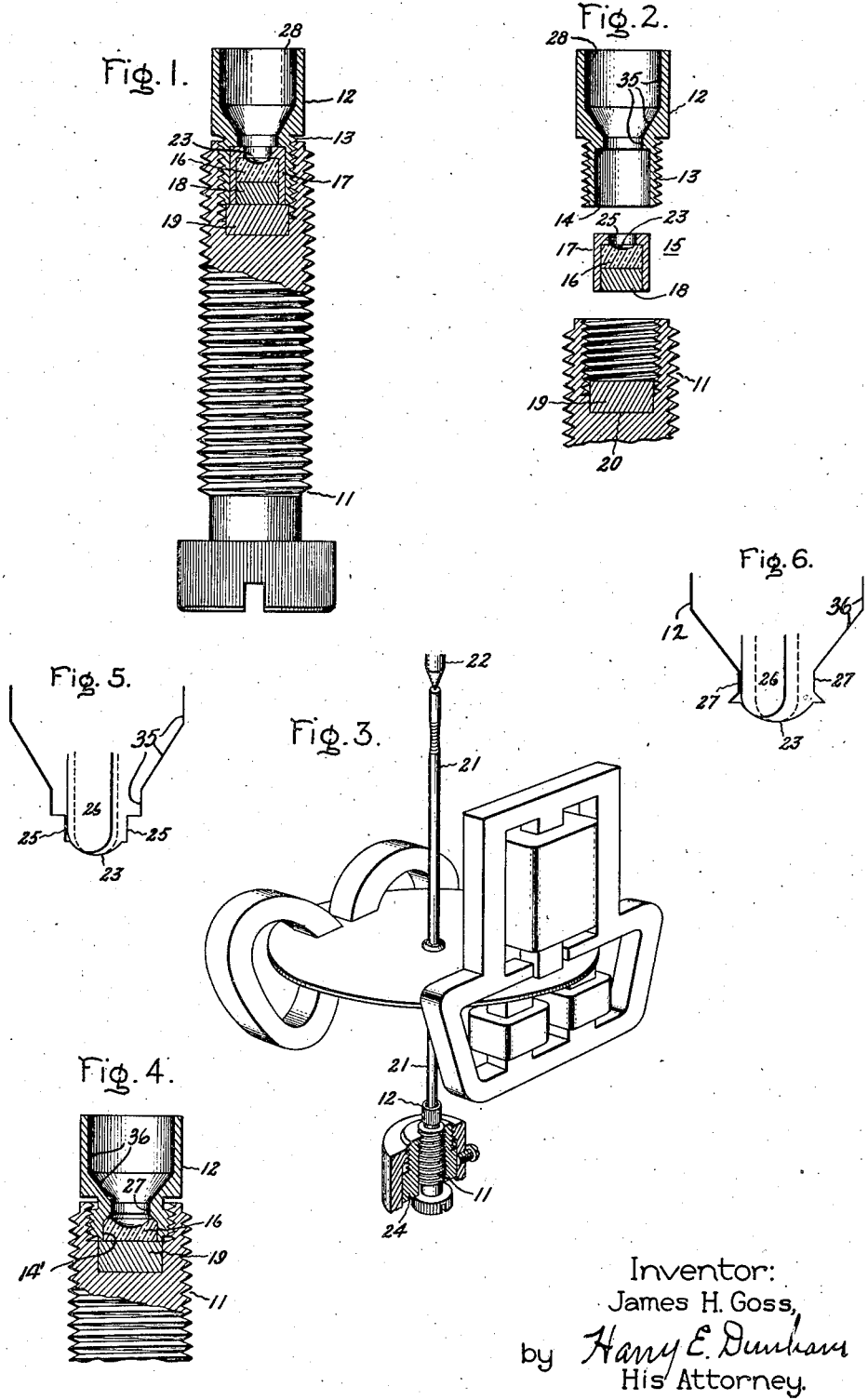

Inventor:
James H. Goss,
by Harry E. Dunham
His Attorney.

Patented May 19, 1936

2,041,601

UNITED STATES PATENT OFFICE 2,041,601

JEWEL BEARING

James H. Goss, Lynn, Mass., assignor to General Electric Company, a corporation of New York Application July 25, 1934, Serial No. 736,871

14 Claims. (Cl. 308—159)

My invention relates to bearing assemblies and concerns particularly thrust bearings of the type in which a jewel is employed for the actual bearing surface.

It is an object of my invention to produce a removable bearing adapted to support a jewel, and in which the jewel may be removably mounted to permit replacement or repair of the jewel without requiring replacement of the entire bearing assembly.

It is also an object to provide an arrangement in which the removable bearing may be disassembled for examination and cleaning without destruction or without the necessity for readjustment or realignment.

Another object is to provide a jewel unit serving not only as end thrust bearing, but also as side thrust bearing in case of overload.

Other and further objects and advantages will become apparent as the description proceeds.

In connection with certain types of revolving apparatus, primarily very light motors of the type employed as watt-hour and ampere-hour meters, it is desirable to provide a very low friction bearing for the revolving member. Frequently, the revolving member is provided with a vertical spindle spherical or pointed at the lower end, which revolves in a cupped jewel or other type of extremely hard bearing surface which supports the revolving element. Frequently, the jewel is mounted in the end of a jewel screw which is threaded into a stationary portion of the apparatus to permit adjustment of the bearing and to facilitate disassembly of the revolving apparatus and removal of the bearing.

In carrying out my invention in its preferred form, I also employ a jewel screw with a jewel mounted in the end thereof. However, I provide an arrangement which permits removing the jewel from the screw for replacement or examination without destruction of the jewel screw itself.

Figure 7:
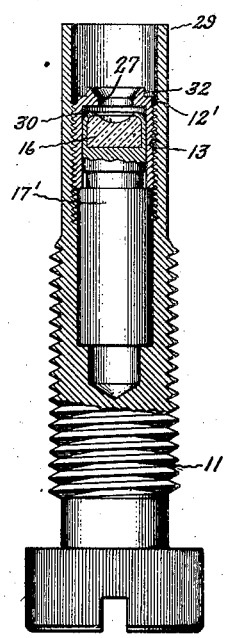
Figure 8:
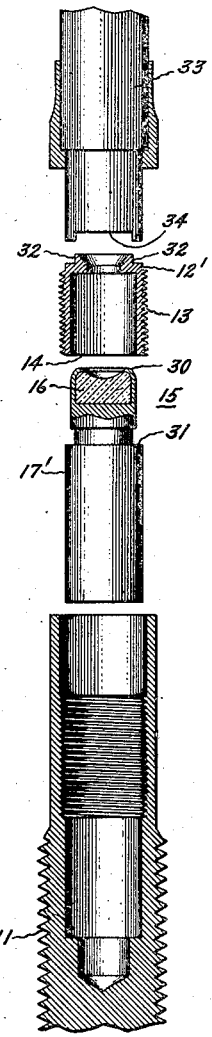

The features of my invention which I believe to be novel and patentable will be pointed out in the claims appended hereto. A better understanding of my invention, itself, however, may be obtained from the following description taken in connection with the accompanying drawings in which Fig. 1 is a view partly in longitudinal section of a jewel screw or bearing assembly constructed in accordance with my invention; Fig. 2 is an exploded view showing in longitudinal section the parts forming the upper portion of the jewel screw shown in Fig. 1; Fig. 3 is a view in perspective of a watt-hour meter illustrating the manner in which the jewel screw is employed; Fig. 4 is a partial view in longitudinal section of another embodiment of my invention; Figs. 5 and 6 respectively are outline diagrams representing the bearing surfaces in the embodiments of Figs. 1 and 4 respectively; Fig. 7 is a view partially in section of another embodiment of my invention; and Fig. 8 is an exploded view of a portion of the embodiment of Fig. 7.

Referring now more in detail to the drawings in which like parts are designated by like reference characters throughout, in the embodiment of Figs. 1, 3 and 4 the jewel screw consists of a threaded and headed rod or machine screw 11 drilled and tapped at one end to receive the lower portion of a knurled sleeve 12 having threads 13 on the outer portion of its lower end to cooperate with the internal threads in the hole in screw 11. The sleeve 12 is countersunk at 14 from the externally threaded end to receive a jewel unit 15. The jewel unit 15 may be a "naked jewel" and may consist simply of a cupped piece of artificial or natural very hard substance such as sapphire or other form of jewel machined to fit in the counterbore 14 in the sleeve 12, and, in using the term "jewel unit" in the accompanying claims, I mean to include a unit either entirely composed of or containing a piece of any hard substance suitable for forming a bearing surface. However, owing to the difficulty in closely machining such hard material as bearing jewels and in order to facilitate obtaining perfect alignment, I ordinarily prefer to mount a jewel 16 in a plug 17 to form the jewel unit 15. If desired, the jewel 16 may be held in the plug 17 and the free space in the plug 17 may be filled in by means of a fusible or malleable substance 18.

Preferably, a body 19 of substantially inelastic deformable material, such as lead, for example, is placed in the bottom 20 of the hole in screw 11 in order to insure that the jewel unit 15 is held tightly in the counterbore 14. This makes it unnecessary to have the lower surfaces of sleeve 12 and jewel unit 15 in perfect alignment with the bottom surface 20 of the hole in screw 11 in order to avoid looseness of the jewel unit 15 in the jewel screw 11. For example, if a yielding material such as lead is employed for the body 19, when the sleeve 12 is screwed into the end of screw 11 against the body 19 in case of any unevenness in the lower surfaces of sleeve 12 and the jewel unit 15, the body of lead 19 will accommodate itself to the lower surfaces of sleeve 12 and jewel unit 15 to hold jewel unit 15 tightly in place in the counterbore 14.

The manner of mounting the jewel screw 11 is shown in Fig. 3 in which a vertical spindle 21 of an integrating meter or a motor is supported between an upper guide bearing 22, which forms no part of my invention, and the depression 23 (Fig. 2) in a jewel 16 mounted within the jewel screw 11. The jewel screw 11 is threaded into a member 24 carried by the housing of the meter or the supporting frame, the remainder of which is not shown in the drawings.

When it is desired to oil the thrust bearing, oil may be placed between the spindle 21 and the bell-shaped upper end 28 of the sleeve 12, whence it flows to the jewel 16 and lubricates the point of contact between the jewel 16 and the lower pointed end or pivot of spindle 21. It is apparent that oil placed in the bearing cannot leak out because the lower end of the part 12 is pressed into the soft metal 19 and effectively seals this joint, thereby saving oil and avoiding the collection of oil and dust on other parts of the apparatus.

When it is desired to disassemble the jewel screw for examination or cleaning or when it becomes necessary to replace the jewel unit 15, this may be readily accomplished by first removing the jewel screw 11 from the meter and then unscrewing the sleeve 12 from the end of the jewel screw 11. Even if the jewel unit 15 should become defective through long use or accident, it is apparent that the remainder of the jewel screw or bearing assembly need not be replaced.

Preferably the opening 25 in the top of the plug 17 containing the jewel 15 is machined to form a smooth side thrust bearing surface in case of heavy overloads of the meter which might tend to deflect the pivot sideways. As is well known, even the sharpest points when viewed under the microscope are found to be slightly rounded so as actually to be blunt or spherical. Consequently, I do not attempt to provide the lower end of the spindle 21 with a truly conical point but preferably form a pivot in or affix a pivot to the lower end of the spindle 21, which pivot has a short substantially cylindrical portion of reduced diameter which is spherical at the end as shown at 26 in Fig. 5.

Normally the pivot 26 rotates in the bottom of and in the center of the depression 23 in the jewel 16 as shown by the dotted lines in Fig. 5. However, in case of heavy overload of the meter of which spindle 21 is a part, such as at 250% load, e. g., axial or transverse forces may be exerted on the spindle 21 which might tend to deflect the pivot 26 off the jewel 16 and to cause the spindle 21 to rub on the side producing excessive friction.

In my construction, however, any such side thrust is taken between the edge of the opening 25 in plug 17 and the pivot 26 which is, of course, of very small diameter. It will be observed that, in even the extreme transversely displaced position of the pivot 26 shown by a full line in Fig. 5, the pivot remains in the jewel. The end thrust is still taken by the jewel 16, the side thrust is taken either by jewel 16 or the surface 25 in plug 17, in either case introducing little frictional retarding torque owing to the small radius of action. The dimensions are such that ample clearance is provided between the spindle 21 or the pivot 26 and the inner surfaces 35 of the sleeve 12 shown in Figs. 1 and 2.

In Fig. 4, I have illustrated an embodiment of my invention in which the jewel unit 15 consists simply of a suitably formed piece of material such as sapphire or other suitable bearing material. The jewel unit 15 is set into a counterbore 14' in sleeve 12 as in the arrangement of Fig. 1. If desired, the internal shape of the sleeve 12 may be modified to form a throat 27 to provide a side thrust bearing in case of heavy overload. The action of the side thrust bearing, as illustrated in Fig. 6, is similar to that explained in connection with the construction of Figs. 1 and 5. It will be apparent also that ample clearance is provided between the spindle 21 or the pivot 26 and the inner surfaces 36 of the form of sleeve 12 shown in Fig. 4.

If desired, the bell-mouthed portion 28 may be omitted from the sleeve 12 and, in this case, the screw 11 is preferably drilled deeper to permit the sleeve 12 to come wholly below the upper end of the screw 11. The mouth 29 of the opening in screw 11, as shown in Fig. 7, then serves substantially the same function as the bell-mouthed portion 28 of the sleeve shown in Figs. 1 and 2.

In another embodiment of my invention illustrated in Figs. 7 and 8, the opening in the screw 11 may be drilled still deeper and an elongated plug 17' may be utilized instead of the form of plug 17 of Fig. 2 to retain the jewel 16. In this case, the plug 17' is provided with a coaxial opening in its upper end conforming substantially to the dimensions of the jewel 16, and the jewel 16 is secured in the plug 17' by peening over the top edge 30 of the plug 17' after the jewel 16 has been inserted therein. In this embodiment, the upper end of the plug 17' is preferably of somewhat reduced diameter to correspond to the internal diameter of the sleeve 12' and the shoulder 31 is left between the upper and lower portions of the plug 17'. Obviously, the relative actual diameters of the lower part of the plug 17', the corresponding portion of the hole, and the jewel screw 11 are such that the plug 17' fits slidably in the jewel screw in order that the plug may readily be inserted or removed. When the jewel screw is assembled, the shoulder 31 takes the thrust from the lower edge of the sleeve 12' and the jewel 16 or the portion of the plug containing the jewel 16 is entirely relieved of stress. By increasing the length of the plug 17', as shown in Figs. 7 and 8, and composing it of an accurately machinable material it is possible to align the jewel 16 very accurately with respect to the axis of the jewel screw 11 and the axis of rotation of the meter in which it is mounted. Since the plug 17' is in a form which may readily be produced by automatic machinery, it is obvious that relatively little expense is involved in replacing the jewel unit 15 after the jewel 16 has completed its period of useful service.

It is apparent that any of the arrangements in which the top of the sleeve 12 or 12' comes below the top 29 of the jewel screw 11 are inherently non-leaking and it is unnecessary to provide packing devices to guard against loss of lubricating oil. These arrangements prevent drawing off of oil by gravity as well as loss of oil through seepage by capillary attraction to the outside of the bearing along capillary spaces between adjacent surfaces such as the external thread and the internal thread of cooperating threaded members.

To facilitate the mounting and removal of the form of sleeve 12' shown in Figs. 7 and 8, the upper face is preferably slotted or specially formed to permit engagement with a screw driver or a suitable wrench. In the arrangement of Fig. 8, two flat lateral faces 32 are cut on the upper end of the sleeve 12'. A wrench 33 is provided, having a broad slot 34 cut in the lower end thereof to engage the upper portion of the sleeve 12'.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:

1. A watt-hour meter jewel screw comprising in combination a machine screw having a coaxial threaded hole in the end thereof, an externally threaded sleeve screwed into said threaded hole and internally counterbored from the end entering said threaded hole, a jewel-bearing unit in the counterbore in said sleeve, and a body of substantially inelastic deformable material in the bottom of the threaded hole in said machine screw holding said jewel-bearing unit tightly in said counterbore when said sleeve is screwed into said threaded hole against said deformable body.

2. A removable cup bearing comprising in combination a screw having a threaded hole in one end thereof, an externally threaded sleeve screwed into said threaded hole and counterbored from the end entering said threaded hole, a jewel unit in the counterbore in said sleeve, and a body of substantially inelastic deformable material in the bottom of the threaded hole in said screw, holding said jewel unit tightly in said counterbore when said sleeve is screwed into said threaded hole against said deformable body, said jewel unit comprising a plug dimensioned for a loose fit in the counterbore in said sleeve and a cupped jewel set in said plug to form a thrust bearing.

3. In combination with an integrating meter having a revolving spindle pointed at one end, a removable thrust bearing cooperating with the pointed end of said spindle comprising a machine screw having a threaded hole in the end thereof, an externally threaded sleeve screwed into said threaded hole and internally counterbored from the end entering said threaded hole, a cupped jewel in the counterbore in said sleeve adapted to support the pointed end of said spindle, and a body of deformable material in the bottom of the threaded hole in said machine screw, holding said jewel tightly in said counterbore when said sleeve is screwed into said threaded hole against said deformable body.

4. A removable thrust bearing for a shaft sharpened to a pivot, comprising in combination a machine screw having a substantially coaxial threaded hole in one end thereof, an externally threaded sleeve having a counterbore in one end, said sleeve being receivable at said end in said threaded hole, thus closing said end and leaving the other end of said sleeve open, and a jewel receivable in said counterbore and held in place when said sleeve is screwed into the end of said threaded hole in said machine screw, said jewel having a pivot-receiving depression therein adapted to face the open end of said sleeve and to be substantially coaxial therewith.

5. A removable lower bearing for a vertical shaft sharpened to a pivot at its lower end, said bearing comprising in combination a screw adapted to be vertically supported and having in its upper end a threaded hole with a vertical axis, a sleeve having a bell mouth at one end and a counterbore in the other end, said counterbored end being externally threaded and receivable in the threaded hole in said screw, and a jewel with a pivot-receiving depression receivable in said counterbore and adapted to be held in place with said depression uppermost when said sleeve is screwed into said threaded hole, whereby a non-leaking bearing is formed adapted to receive lubricant through the bell mouth of said sleeve.

6. In combination with a rotating meter having a spindle sharpened to a pivot at one end, a removable bearing for the pivot end of said spindle comprising a removable member having a hole extending into it and threaded, an externally threaded sleeve having a counterbore at one end and a minimum internal diameter greater than the diameter of said spindle and being receivable at said counterbored end into said threaded hole, and a jewel with a pivot-receiving depression therein, said jewel being receivable in said counterbore and being adapted to be held in place when said sleeve is screwed against the bottom of said threaded hole, whereby said spindle is permitted to revolve in said sleeve without contact therewith supported at its pivot by said jewel.

7. A thrust bearing comprising a supporting member, a sleeve adapted to be fastened in end engagement with said supporting member and having a counterbore in the end toward said supporting member, said counterbore forming a shoulder, and a jewel unit including a jewel adapted to be received in said counterbore, said sleeve being fastened against said supporting member and holding said jewel unit between said shoulder and a portion of said supporting member.

8. A thrust bearing comprising a sleeve and a naked jewel supported in said sleeve and having a cupped portion substantially coaxial therewith, said sleeve having its internal diameter reduced adjacent the cupped portion of said jewel to form a throat having a diameter of substantially the same order of magnitude as the diameter of the cupped portion of said jewel, said throat serving as a side-thrust bearing surface and the cupped portion of said jewel serving as an end-thrust bearing surface and said reduction in internal diameter forming adjacent said throat a shoulder abutting the rim of said cupped portion to fix the axial position of said naked jewel in said sleeve.

9. A thrust bearing comprising a supporting member having a hole extending into it, a sleeve, and a plug comprising two cylindrical portions conforming in diameter respectively to the diameter of the hole in said supporting member and the inner diameter of said sleeve and having a jewel in the end of the portion of smaller diameter, said plug being placed in the hole in said supporting member with the jewel end toward the open end of the hole, said sleeve being provided with fastening means engaging the supporting member, and said sleeve being mounted substantially coaxially in the hole in said supporting member against the shoulder formed in said plug at the point where its diameter changes.

10. A thrust bearing comprising a supporting member having a cylindrical hole extending vertically into it from above, a removable plug having a cylindrical portion with a diameter conforming substantially to the diameter of said hole to fit therein slidably and having a jewel mounted in the upper end thereof, and removable means engaging an intermediate portion of said plug for pushing the lower portion of said plug down against the bottom of said hole, thus supporting said plug rigidly in said supporting member without stressing the portion thereof containing said jewel.

11. A thrust bearing comprising a supporting member having a vertical hole extending into it, a removable plug having a portion in said hole conforming substantially to the shape thereof, and a portion of smaller cross section above said first mentioned portion, thus forming a shoulder at the upper end of said first mentioned portion, said plug having a jewel mounted therein in the portion above said shoulder, and means bearing downward against said shoulder and securing said plug in said hole.

12. A thrust bearing comprising a supporting member having a vertical hole extending downward into but not through it, a removable plug wholly contained within said hole having a jewel mounted in the upper portion thereof, and removable means also wholly within said hole securing said plug rigidly in said hole, whereby any capillary spaces tending to promote seepage of bearing oil are below the mouth of said hole.

13. A watt-hour meter jewel screw comprising in combination, a machine screw having a coaxial cylindrical hole extending into the end thereof, removably supported therein, a plug having a cylindrical portion conforming substantially in diameter to the diameter of the hole in said screw, said hole having an outer end of sufficient diameter to permit insertion and removal of said plug, said cylindrical portion being substantially greater in length than in diameter, said plug having mounted in the end thereof toward the outer end of said hole a jewel with a cupped portion substantially coaxial with said plug, and means for rigidly securing said plug in said screw.

14. In combination with a meter having a rotating spindle and a bearing supporting portion with a threaded hole therein substantially coaxial with said spindle, a thrust bearing for an end of said spindle comprising a machine screw removably threaded into said bearing supporting portion, said machine screw having a substantially coaxial hole extending into the end thereof and having the end directed toward said spindle to receive the end of the latter, a plug having a cylindrical portion conforming substantially in diameter to the diameter of the hole in said machine screw and being of greater length than diameter, said hole having an outer end of sufficient diameter to permit insertion and removal of said plug, said plug having mounted in the end thereof toward the outer end of said hole a jewel with a cupped portion substantially coaxial with said plug and receiving one end of said spindle, and means for rigidly but removably securing said plug within said screw.

JAMES H. GOSS.